United States Patent Office 3,629,298
Patented Dec. 21, 1971

---

3,629,298
STEROIDAL 3-KETO-$\Delta^{1,4}$-DIENE-3-ENAMINES
Verlan H. Van Rheenen, Kalamazoo, Mich., assignor to
The Upjohn Company, Kalamazoo, Mich.
No Drawing. Continuation-in-part of application Ser. No.
643,825, June 6, 1967. This application Feb. 24, 1969,
Ser. No. 801,859
Int. Cl. C07c 169/24
U.S. Cl. 260—397.1                                   6 Claims

ABSTRACT OF THE DISCLOSURE

This invention relates to the synthesis of steroidal 3-keto-$\Delta^{1,4}$-diene 3-enamines using titanium tetarachloride as an assistant to the reaction.

REFERENCE TO RELATED APPLICATION

This is a continuation-in-part of application Ser. No. 643,825, filed June 6, 1967 now abandoned.

SUMMARY OF THE INVENTION

According to the invention, steroidal 3-keto-$\Delta^{1,4}$-dienes possessing a double bond at $C_{17}$ such as the 3-keto-1,4,17 (20)-pregnatrien-21-carbonyloxyl steroids disclosed in U.S. Patent 2,774,775, can be converted to the 3-enamines by reaction with a secondary amine such as dimethylamine, diethylamine or pyrrolidine in the presence of titanium tetrachloride and, preferably, in an inert organic solvent such as benzene.

The 3-enamines of 3-keto-$\Delta^{1,4}$-steroid dienes that are prepared in accordance with this invention are useful chemical intermediates for the synthesis of biologically active steroids as disclosed in the patent identified above, the function of the 3-enamine group being to protect the A-ring functionality from chemical reaction such as reduction, while carrying on reductive reactions at other positions in the molecule, e.g., at an 11-keto group or a 21-carboxyl group. As disclosed in the patent identified above, the 3-keto-$\Delta^{1,4}$ structure of the A-ring of the steroid can be regenerated by treatment with alkali.

The term "steroidal" as used in this specification and claims relates to the basic cyclopentanopolyhydrophenanthrene tetranuclear structure possessing angular methyl groups at positions 10 and 13 which may or may not possess substitutents attached to the nuclear rings. The substituents contemplated on the steroidal 3-keto-$\Delta^{1,4}$-diene starting materials are those which are non-interfering and would include the hydroxyl, acyloxy, methyl or other lower alkyl, methylene or other lower alkylene, fluoro or other halogen, or non-interfering keto and the substituents can be situated at positions in the steroidal molecule conventionally encountered in steroid products possessing pharmacological activities such as position 6, 7, 9, 11, 12, 15, 16 and 17. The starting materials may also contain additional double bonds and carboxyl groups as illustrated by 1.

The preferred starting materials can be represented by the following structural formula:

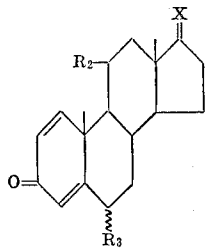

wherein X represents (CH—COOR), (CH—$CH_2OR_1$) or (O); $R_2$ represents (H,H), (H,OH) or (O); and $R_3$ represents H, a lower alkyl group, or halogen. In these formulas R represents hydrogen or a lower alkyl group, $R_1$ represents the acyl radical of a hydrocarbon carboxylic acid of from 1 to 12 carbon atoms, and the designation ₹ is a generic expression denoting α or β stereoconfiguration or mixtures thereof. Enamine formation, of course, eliminates stereoconfiguration ot $R_3$. Upon reconstruction of the $\Delta^{1,4}$-3β structure (i.e., removal of the enamine) the more stable α-configuration predominates.

A class of novel and useful compounds is afforded by the process of this invention as is illustrated in the following examples, namely the enamines of the foregoing class of compounds desired of lower aliphatic open chain secondary amines such as diethylamine, diisobutylamine, dipropylamine and the like, containing from 1 to 8 carbon atoms in each of the aliphatic groups. This novel class of compounds is represented by the following formula:

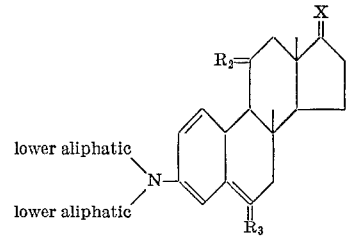

in which the values of X, R, $R_1$, $R_2$ and $R_3$ are as given above.

DETAILED DESCRIPTION OF THE INVENTION

A typical starting steroidal 3-keto-$\Delta^{1,4}$-diene is one having the following structure:

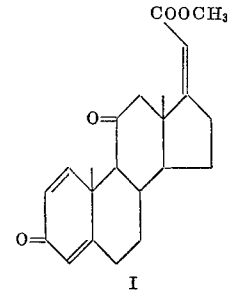

I

A typical 3-enamine product has the following structure:

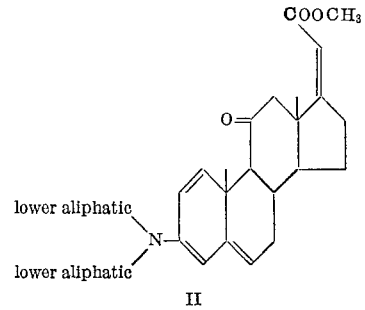

II

It has been shown that preparation of enamines of I by conventional methods is difficult, and low yields are encountered when employing starting material having the A-action of I [J. A. Hogg, B. J. Magerlein and J. Korman, Steroids 3:2 190 (1964)]. The difficulty of re-action of I toward the formation of other protective groups at 3 is known [M. J. Gentles, J. B. Moss, H. L. Herzog and E. B. Hershberg, J.A.C.S. 80, 3702-5 (1958)]. The use of titanium tetrachloride in the synthesis of enamines of certain hindered aliphatic ketones has been described [W. A. White and H. Weingarten, J.O.C. 32, 213 (1967)]. This prior reaction does not relate to the use of ketones having complex conjugated doublebondd tetranuclear systems such as I.

The amount of titanium tetrachloride used in this invention is preferably 0.55 to 0.70 mole equivalents relative to the 3-keto-$\Delta^{1,4}$-steroidal diene.

The reaction can be carried out at room temperature though the temperature may vary from 0° C. up to the boiling point of the reaction mixture. Lower temperatures are likely to work as long as the solvent used does not freeze.

The secondary organic amine can be any such as dialiphatic amine, or N-aliphatic aromatic amine such as N-ethyl-aniline, or a heterocyclic amine such as the pyrrolidines or piperidines as disclosed in U.S. Pat. 2,781,343, or morpholine.

When titanium tetrachloride is used in excess of equivalent quantities, a considerable amount of enamine formation occurs as position $C_{11}$ as well as at $C_3$, giving III below, which reduces to IV as shown:

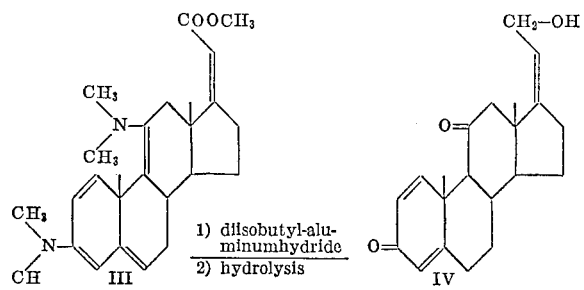

Such enamines as III are heretofore unknown and are useful in the preparation of prednisone by applying the reduction step using diisobutyl aluminum hydride or lithium aluminum hydride to produce the 17(20)-ene-21-ol structure without reducing the 11-keto protected group. This permits direct oxidative hydroxylation to prednisolone by applying the teachings in U.S. Pat. No. 2,774,775, i.e., by reaction of the 21-acylated steroid with hydrogen peroxide and a small proportion of osmium tetroxide.

The 3,11-dimethyl dienamines of 3,11-diketo-4,17(20)-pregnadiene 21-oic acid methyl ester find a similar use in the more direct preparation of cortisone by the steps of reducing the carboxyl group followed by the 21-esterification and then oxidative hydroxylation.

Formation of the 3,11-dimethyl dienamines as described above is aided by using a greater excess of titanium tetrachloride in the reaction, i.e., up to twice the molal ratio of the steroid used.

When using diethylamine in the process of this invention, the reaction seems to be more selective for exclusively forming the $C_3$ diethylenamine corresponding to II, and for this reason it and other secondary amines of greater steric bulk than dimethylamine are preferred when the 3-monoenamine product is desired.

EXAMPLE A

Experimental

Preparation of dimethylenamine II (8644-VVR-48)

Into a solution of 9.0 g. of dimethylamine in 130 ml. of benzene at 0° C., is slurried 7.1 g. of $\Delta^1$-Favorskii methyl ester (I). To this mixture under nitrogen is slowly added a solution of 2.1 g. of titanium tetrachloride in 10 ml. of benzene, keeping the reaction temperature below +5° C. The reaction is allowed to warm to room temperature and is stirred for two hours. Filtration of the precipitated titanium oxide and dimethylamine hydrochloride gives a light-yellow solution. Evaporation of the solvent and addition of methanol gives 2.5 g. of crystalline dimethylenamine II, which is analytically pure. M.P.: 170–174° C.

Calcd. for $C_{24}H_{31}NO_3$ (percent): C, 75.55; H, 8.19; N, 3.67. Found (percent): C, 75.13; H, 8.14; N, 3.67.

$\lambda_{max.:}^{EtOH}$ 222(21,650); 279 sh, (5,700); 330 m$\mu$ sh, ($\epsilon$2,750)

N.M.R. (CDCl$_3$): 60 (3H), 80 (3H), 159 (6H), 218 (3H), 295 (1H), 314 (1H), 340 (1H), 354 (1H), 389 cps. (1H).

The yield of enamine in the above example, based on material consumed, is in the range of 60–80%.

In place of the methyl ester above, the $\Delta^1$-Favorskii ethyl, propyl or butyl esters can be used to produce, respectively, the corresponding 3-enamines.

In place of dimethylamine above, diethylamine, dipropylamine, diisobutylamine, propyl butyl amine or pyrrolidine, 2,4-dimethylpyrrolidine and the like as disclosed in the analogous $\Delta^4$ compounds in U.S. Pat. 2,781,343 can be used, to produce, respectively, the corresponding 3-enamines.

In place of the starting material above, a compound having the skeletal structure of IV can be used, or its 21-acyl ester of a hydrocarbon carboxylic acid of from 1 to 12 carbon atoms (e.g., formic, propionic, butyric, isobutyric, valeric, isovaleric, trimethylacetic, 2-methylbutyric, 3-etyhlbutyric hexanoic, diethylacetic, triethylacetic, heptanoic, octanoic, $\alpha$-ethylisovaleric, or other hydrocarbon carboxylic acid containing from 1 to 12 carbon atoms, inclusive, e.g., cyclopropylideneacetic, cyclopentylformic, cyclopentylacetic, $\beta$-cyclohexylpropionic, cyclohexylformic, cyclohexylacetic, $\beta$-cyclohexylpropionic, an aryl or alkaryl acid, e.g., benzoic, 2, 3 or 4-methylbenzoic, 2,3-, 2,4-, 2,5-, 2,6-, 3,4- and 3,5-dimethylbenzoic, ethylbenzoic, 2,4,6-trimethylbenzoic, $\alpha$-naphthoic, 3-methyl-$\alpha$-naphthoic, phenylacetic, phenylpropionic, etc.).

EXAMPLE B

Preparation of diethylenamine II (8644-VVR-69)

Diethylamine is substituted for dimethylamine in the process of Example A. The quantity of titanium tetrachloride is increased to 2.4 g. and a few drops of water in about 2 ml. of diethylamine is added just prior to the filtration step. Evaporation of the solvent and addition of methanol gives the crystalline diethylamine II in analytically pure form and in a yield of 86%. M.P. 148–156° C.

Calcd. for $C_{26}H_{35}NO_3$ (percent): C, 76.24; H, 8.61; N, 3.41. Found (percent): C, 75.81; H, 8.53; N, 3.46.

EXAMPLE C

Preparation of 3-diethylenamine of 6$\beta$-methyl Favorskii methyl ester (8671-VVR-75)

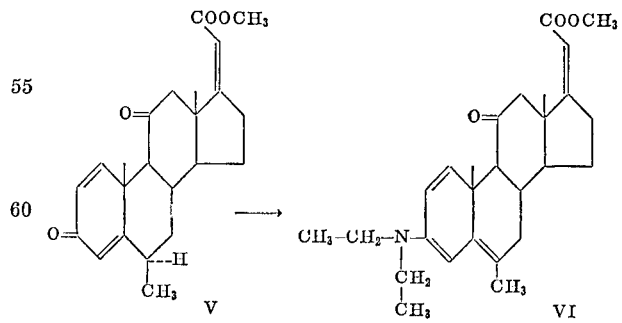

A slurry of 3.0 g. of (V) in 40 ml. of dry benzene is cooled to 5° C. and 10 ml. diethylamine is added. A solution of 0.55 ml. titanium tetrachloride in 20 ml. benzene is added dropwise over ½ hour. After complete addition the reaction is allowed to warm to room temperature where upon it is stirred for 2 hours. Then 0.2 ml. of H$_2$O in 2 ml. diethylamine is added with vigorous stirring and the precipitate of titanium oxide and amine hydrochloride filtered over sodium sulfate and washed with benzene. The filtrate is evaporated to dryness under vacuum giving an off-white solid which on trituration with methanol yields 2.26 g. (66%) of VI.

M.P.: 131–137° C.
NMR (CDCl₃): 60, 78, 64, 187, 219, 302, 341, 354, and 338 cps.

Calcd. (percent): C, 76.55; H, 8.80; N, 3.31. Found (percent): C, 76.22; H, 8.70; N, 3.20.

EXAMPLE D

*Preparation of 3-diethylenamine of 6α-methyl Favorskii methyl ester (9418–MOP–113)*

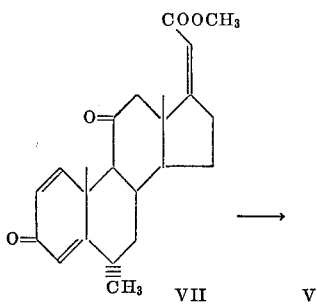

To a solution of 6 ml. diethylamine in 15 ml. of dry benzene at 15° is slowly added 0.5 ml. of titanium tetrachloride in 10 ml. of benzene. After stirring 30 minutes, this titanium chloride-amine complex is then added over 30 minutes to a solution of 1.8 g. of VII in 10 ml. of dry methylene chloride at room temperature. After the addition, this heterogeneous mixture is stirred at 5° for 3 hours after which 0.2 ml. of water in 1 ml. diethylamine is added with vigorous stirring. The resulting precipitate is filtered over sodium sulfate and washed with benzene. The filtrate is evaporated to dryness under vacuum, resulting in 2.0 g. (96%) of tan solid which is homogeneous by NMR. Trituration with cold methanol gives 1.3 g. of yellow solid identical in all respects with VI obtained from V in Example C.

EXAMPLE E

*Preparation of 3-diethylenamine of Δ¹,⁴-androstadiene-3,17-dione (8418–MOP–131)*

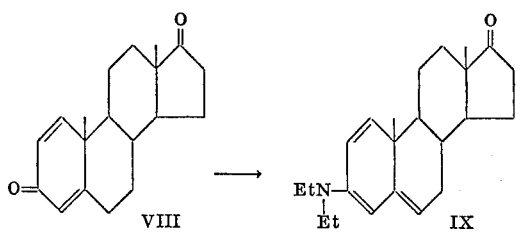

To a solution of 10 g. diethylamine in 15 ml. of dry benzene is added dropwise a solution of 0.5 ml. titanium tetrachloride in 10 ml. benzene. This solution of titanium tetrachloride amine complex is then added slowly to a mixture of 2.0 g. of VIII in 20 ml. of benzene and 10 ml. diethylamine maintained at −10° C. After stirring at −10° for 3 hours, 0.2 ml. of water in 2 ml. diethylamine is added with vigorous stirring and the resulting precipitate filtered over sodium sulfate and washed with benzene. The filtrate is evaporated to dryness under vacuum giving 1.9 g. of solid IX.

NMR (COCl₃)=57 (3H), 70 (3H), 63 tr. (6H), 187 (4H), 300 (1H), 317 (1H), 362 (1H), 366 (1H), 334 cps. (1H)

Mass spectrum=339 (m.⁺), 324, 311, 286, 284 m./c.

The product IX can be reduced by known methods for reducing steroid keto groups to the corresponding 17-hydroxyl compound by reaction with lithium aluminum hydride or diisobutyl aluminum hydride; the Δ¹,⁴-3-keto structure subsequently regenerated by base catalyzed hydrolysis, and the resulting product converted to the known useful product, estradiol, by known methods.

I claim:
1. The compound

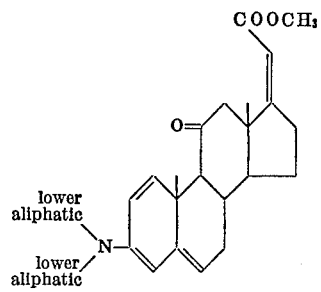

2. The process which comprises reacting a compound of the following structural formula:

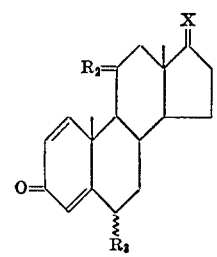

in which
X=CH—COOR, CH—CH₂OR₁, O,
R=hydrogen or a lower alkyl group,
R₁=the acyl radical of a hydrocarbon carboxylic acid of from 1 to 12 carbon atoms,
R₂=(H,H), (H,OH) or (O),
R₃=H, halogen or a lower alkyl group,
=α or β or mixture of α and β
with a secondary amine in the presence of titanium chloride.

3. The method of claim 2 in which the starting material is:

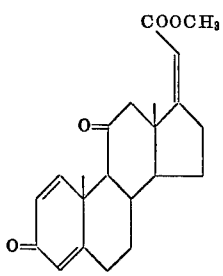

4. The method of claim 2 in which the starting material is:

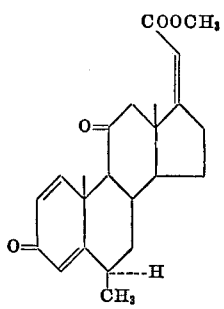

5. The method of claim 2 in which the starting material is:
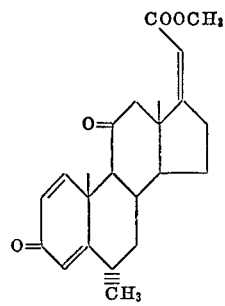
6. The method of claim 2 in which the starting material is:
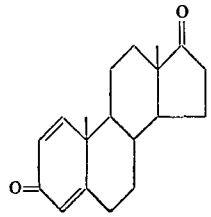
References Cited
UNITED STATES PATENTS
2,774,775  12/1956  Korman.
3,274,176  9/1966  Dubé _____ 260—239.5
ELBERT L. ROBERTS, Primary Examiner
U.S. Cl. X.R.
260—239.5, 397.3, 397.45, 397.5

UNITED STATES PATENT OFFICE
CERTIFICATE OF CORRECTION

Patent No. 3,629,298            Dated December 21, 1971

Inventor(s) Verlan H. Van Rheenen

It is certified that error appears in the above-identified patent and that said Letters Patent are hereby corrected as shown below:

Column 2, line 20, the formula should appear as shown below instead of as in the patent:

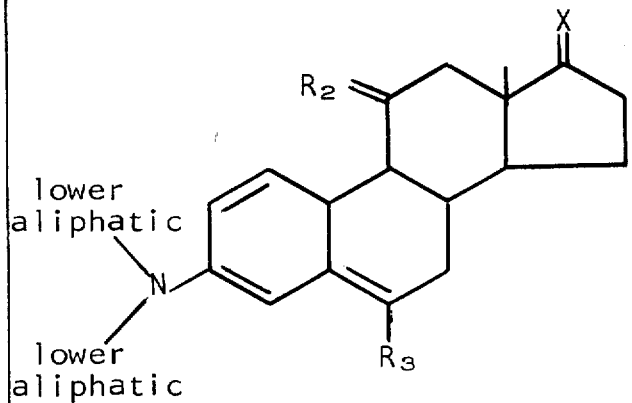

Column 2, line 66, for "the A-action of I" read --the A-ring structure of I--. Column 3, lines 59 and 61, for "Example A Experimental"

read

--Experimental

Example A--.

Signed and sealed this 25th day of July 1972.

(SEAL)
Attest:

EDWARD M. FLETCHER, JR.            ROBERT GOTTSCHALK
Attesting Officer                  Commissioner of Patents